United States Patent [19]

Nelson et al.

[11] Patent Number: 5,351,855
[45] Date of Patent: Oct. 4, 1994

[54] HUMIDISTAT RESET CONTROL

[75] Inventors: Lorne W. Nelson, Bloomington, Minn.; Eric W. Grald, Canaan, N.H.

[73] Assignee: Honeywell Inc., Minneapolis, Minn.

[21] Appl. No.: 862,131

[22] Filed: Apr. 2, 1992

[51] Int. Cl.⁵ ............................................. G05D 22/00
[52] U.S. Cl. .................................. 236/44C; 62/176.6
[58] Field of Search ............... 236/44 R, 44 A, 44 C, 236/46 R, 46 A, 46 C, 46 F, 47, 91 R, 91 C, 49.3; 62/176.6, 248; 165/20

[56] References Cited

U.S. PATENT DOCUMENTS

| | | | |
|---|---|---|---|
| 2,314,232 | 3/1943 | McLenegan | 236/44 C |
| 3,181,791 | 5/1965 | Axelrod | 236/44 C |
| 3,279,699 | 10/1966 | Nelson | 236/44 C |
| 4,350,286 | 9/1982 | Sutoh et al. | 236/44 A |
| 4,361,273 | 11/1982 | Levine et al. | 236/11 |
| 4,869,073 | 9/1989 | Kawai et al. | 236/44 C |
| 5,058,388 | 10/1991 | Shaw et al. | 62/176.6 X |
| 5,092,520 | 3/1992 | Lestage | 236/44 A |

FOREIGN PATENT DOCUMENTS 0175126 3/1986 European Pat. Off. .

Primary Examiner—Harry B. Tanner
Attorney, Agent, or Firm—Craig J. Lervick

[57] ABSTRACT

An environmental control system that utilizes the output of a thermostat to estimate the outdoor temperature can be used to eliminate the possibility of condensation on the inside of windows and on the inside of the walls. This is important in homes and buildings that are located in areas where the outdoor temperature gets very low. An acceptable humidity level can be calculated when the outdoor temperature has been determined. Once the acceptable humidity level is calculated, this value can be communicated to the humidistat so the humidity level within the house can then be adjusted accordingly. The humidistat can have the capability to manually override the automatic adjustments, thus giving the operator the flexibility of maintaining the humidity level within the building at a desired level.

18 Claims, 3 Drawing Sheets

HUMIDISTAT RESET CONTROL

BACKGROUND OF THE INVENTION

The present invention relates to an environmental control system for a home or building. Specifically, the invention relates to an environmental control system which is capable of the automatic adjustment of the humidistat setpoint so as to avoid condensation on windows or walls or both.

Typically the environmental conditions within a building are maintained during the heating season by the use of a furnace or heat pump to heat indoor air and a humidifier to provide moisture to the indoor air. In regions where the outdoor air temperature varies significantly such as due to the changing seasons, the amount of humidity provided by the humidifier needs to be adjusted periodically in relation to changes in the outdoor air temperature. If the humidity level is not adjusted as the temperature changes, condensation can build up on the inside of walls, windows, and other parts of the building. This is especially crucial during the winter months when the outdoor air temperature gets colder since the possibility of condensation is inversely related to the outdoor temperature. As the outdoor air temperature drops it becomes much easier to build up condensation on the windows and the exterior walls of a building. This condensation can create many problems including the windows becoming non-transparent and damage to the wood and construction materials of the walls, ceilings or both. Consequently, it is desirable to lower the humidity level within the controlled space in order to prevent condensation on the windows, outside walls, ceiling, or any combination thereof.

various means have been used to try to control the humidity level within a home in relation to outdoor air temperatures. Specifically, humidity sensors or frost sensors have been placed on windows and have been used to sense the presence of condensation. Once condensation is detected the humidity level of the building is then adjusted to eliminate the condensation.

Another method of avoiding condensation within the house is to place a temperature sensor in the heat supply duct of the furnace. This sensor measures the load on the heating system. Once the heating system load is known, the humidity level within the house can then be adjusted. A device utilizing this method is shown in the Honeywell H403 humidity control described in U.S. Pat. No. 3,279,699.

All of the aforementioned methods of humidity control have required the use of additional sensors and in some cases complex circuitry to achieve the required goals. Additionally, installation of these products may be complicated and at times very difficult.

SUMMARY OF THE INVENTION

In the present invention, an environmental control system is presented wherein humidity control is accomplished by monitoring the operation of a thermostat and adjusting a humidistat setpoint based on the monitored thermostat operation, without the use of additional temperature or humidity sensors.

In a home or building of any type, the load on the heating system is directly related to the outdoor air temperature. Heating system load is the amount of energy required to maintain a constant temperature within a home or building. When the load on the heating system changes this suggests that the outdoor air temperature has changed. If the load increases, it suggests that the outdoor air temperature has dropped and conversely, if it decreases, it suggests that the outdoor air temperature has increased Humidity control is achieved by monitoring various signals from the thermostat and utilizing appropriate algorithms to determine whether the heating load has changed and whether the humidistat setpoint should be adjusted. One monitored signal is the set-back status signal. This signal indicates whether the thermostat is in a set-up or a set-back condition. A set-back is the time period during which the temperature is dropping from a constant setpoint temperature to a lower constant setpoint temperature. Alternatively, a set-up is the time period when the temperature is being raised from a constant setpoint temperature to a higher constant setpoint temperature.

During the set-back period of thermostat operation, a house can be characterized. That is, the temperature decay characteristics of a house can be determined. After monitoring the temperature during a set-back operation, an equation is derived that indicates the relationship of the temperature decay of a house to the outdoor temperature.

From the information received during the set-back period it is possible to estimate the outdoor temperature when the sensed indoor temperature, the thermostat setpoint, and a thermostat error signals are known. These signals can be easily determined, because they all can be monitored within a single thermostat. From an estimation of the outdoor temperature a humidity setpoint which will avoid condensation can be calculated.

A calculated humidity setpoint which will avoid condensation is then communicated to the humidistat. Subsequently, the humidistat can control the humidity level within the space based upon the lower of the actual humidistat setpoint or the calculated humidistat setpoint.

An object of the present invention is to present an environmental control system which is able to manage the humidity level of a space based soley on thermostat operation. By monitoring certain signals generated within the thermostat, all information necessary for such humidity control is available.

BRIEF DESCRIPTION OF THE DRAWINGS

The invention may be better understood from a reading of the following detailed description in conjunction with the drawings in which.

DESCRIPTION OF THE PREFERRED EMBODIMENT

Figure 1:
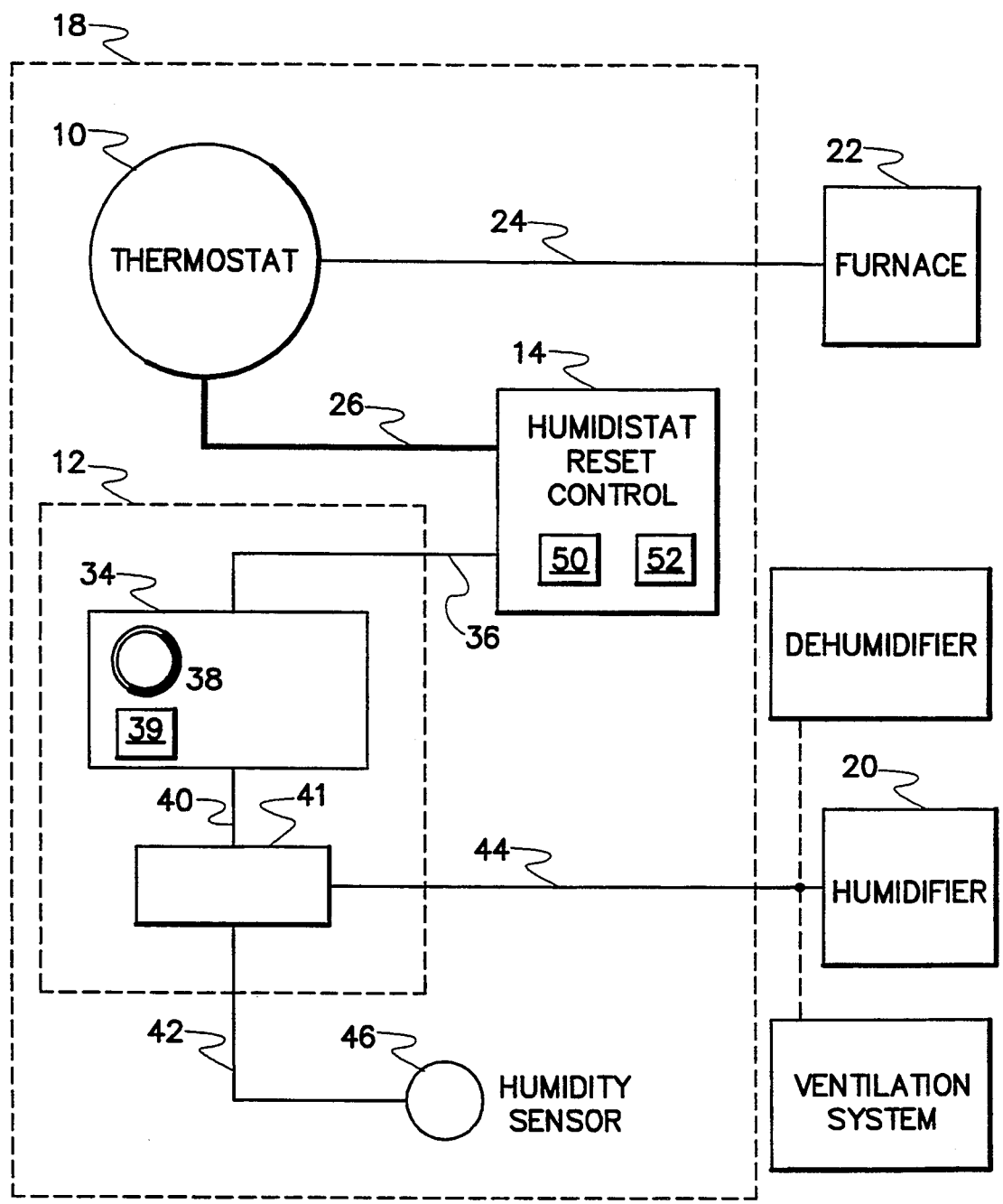
FIG. 1 shows a functional block diagram of the humidistat reset control.

Referring to FIG. 1 in more detail, there is shown a functional block diagram of an environmental control system 18. Environmental control system 18 is connected to a means for heating or furnace 22 and humidifier 20, in order to control both the humidity and the temperature of a space.

Environmental control system 18 includes thermostat 10 which is used for controlling furnace 22. In the preferred embodiment thermostat 10 has a microcomputer or microprocessor to control the temperature of a space. Such thermostats are common in the art. Thermostat 10 outputs an error signal 28 that is proportional to the difference between a setpoint temperature and a sensed temperature. When error signal 28 reaches a predetermined value, a heating system output 29 is generated to energize furnace 22. Furnace 22 is energized via connection 24 between thermostat 10 and furnace 22.

In the preferred embodiment, thermostat 10 has communications link 26 with humidistat reset control 14. Communications link 26 provide a means to communicate a number of signals from thermostat 10 to humidistat reset control 14. These signals include: setpoint temperature 30, sensed temperature 31, thermostat error signal 28, set-back status 32 and recovery status 33. Using these signals, received from thermostat 10, humidistat reset control 14 can calculate the desired humidity level. The process of determining desired humidity setpoint utilizing the above mentioned signals is more fully described herein.

Within environmental control system 18 is a humidistat 12. Humidistat 12 is connected to humidity sensor 46, humidifier 20, and humidistat reset control 14. It would be understood by those skilled in the art that humidity can be controlled utilizing devices other than a humidifier. Another way to control humidity can be through the use of dehumidifier or through the use of appropriate air ventilation controls. These connections are made via connections 42, 44, and 36 respectively. Within humidistat 12 are humidistat setpoint control 34 and humidifier control 41. Humidistat 12 is used to control the humidity level of a space by energizing humidifier 20 when the output of humidity sensor 46 signals that the humidity is below desired humidity setpoint. This function is performed by humidifier control 41. A calculated setpoint signal 58 indicative of the desired humidity setpoint is transmitted via connection 36 to humidistat 12 from humidistat reset control 14.

Humidistat setpoint control 34 contains a manually adjustable setpoint 38 and logic 39 to determine if humidifier control 41 should operate at manually adjusted setpoint or at a setpoint calculated by humidistat reset control 14. Calculated setpoint signal 58 received from humidistat reset control 14, is compared with manual setpoint signal 38, and the smaller of these two signals is output to humidifier control 41 via connection 40.

A primary feature of the present invention is the operation of humidistat reset control 14. In the preferred embodiment humidistat reset control 14 may contain memory means 50 and logic means 52 to store and execute control algorithms. These means may be contained in a single component or may be a number of different components.

As will be recognized by those skilled in the art, all of the components of environmental control system 18 shown in FIG. 1 are functional blocks. All calculation and other functions could be performed by a single microprocessor or by a single device having a plurality of logic components, or by a number of discrete devices.

The essence of the present invention is that the outdoor air temperature is related to the heating load on the heating system. This load can be determined by monitoring the thermostat. The monitored load can be used to make an estimate of the outdoor air temperature, which can in turn be used to calculate a humidity setting which will eliminate the possibility of condensation on walls, windows, or both.

Figure 2:
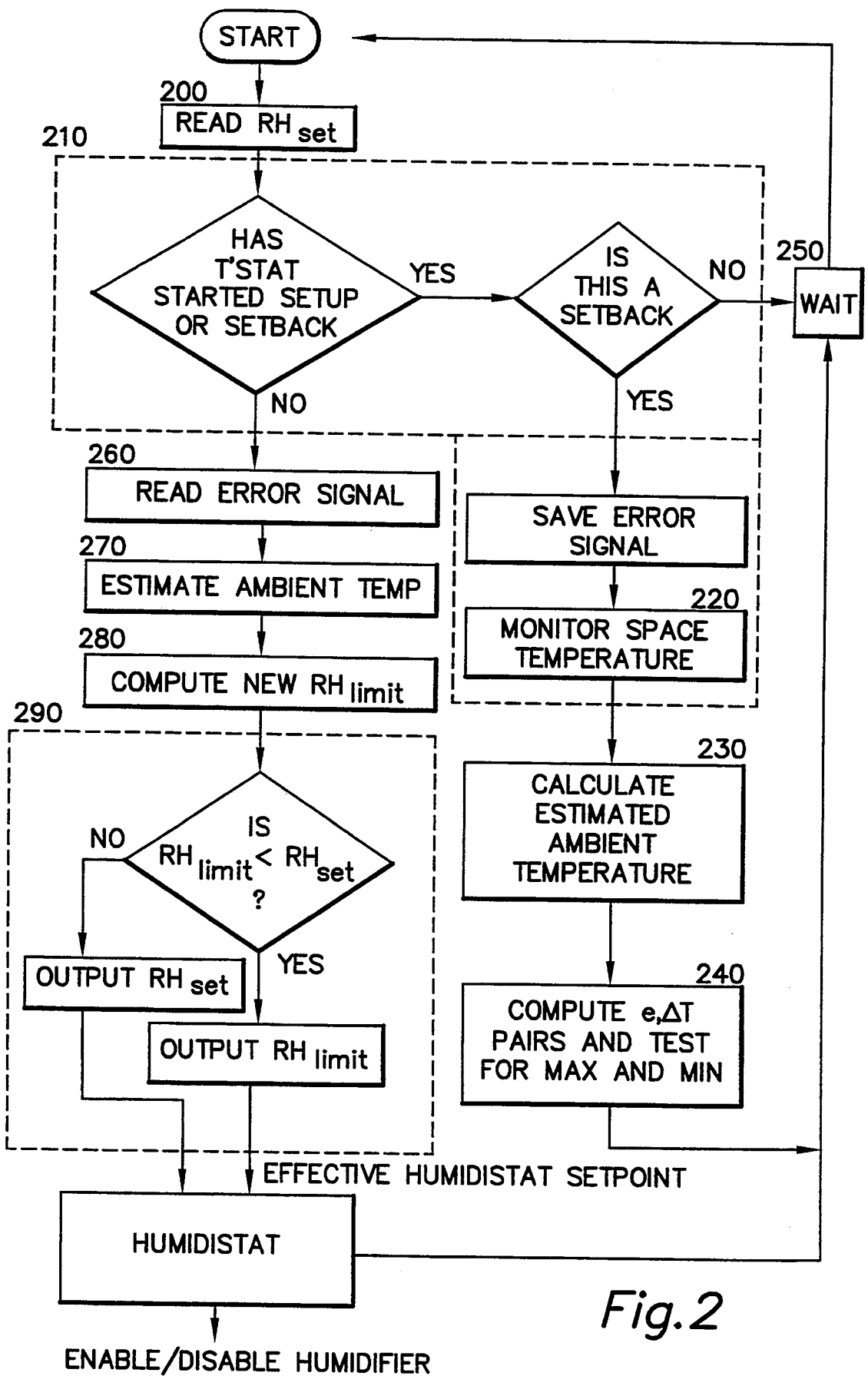
FIG. 2 shows the flow diagram of the process followed wherein thermostat signals are monitored by the humidistat reset control and a humidity setting is calculated.

Referring to FIG. 2, the control sequence shown is repeated periodically by environmental control system 18 to achieve dynamic control of humidity. Then humidistat reset control 14 checks thermostat set-back status signal 32 to determine if thermostat 10 is causing a temperature set-back. (See 210) The set-back status will dictate what the next operation of humidistat reset control 14 will be.

If thermostat 10 is presently in a temperature set-back transition, humidistat reset control 14 saves thermostat error signal 28 in memory, the space temperature is closely monitored by monitoring sensed temperature signal 31, and the setpoint temperature signal 30 which is output to humidistat 12 remains constant. (See 220) When thermostat 10 is causing a temperature set-back, the calculated setpoint signal 58 is not changed because the operation of thermostat 10 is not necessarily indicative of the true heating load, therefore, any adjustments to the humidistat setpoint control 34 based on thermostat operation would be inaccurate. The space temperature is closely monitored so the temperature decay characteristics of the home can be determined.

In order to carry out the process of calculating a desired humidistat setpoint, it is necessary to determine the building's resistance to change in temperature. Specifically it is necessary to determine the time constant of the controlled space if the sensed temperature was allowed to decay exponentially to the outdoor temperature. This assumes that the outdoor temperature is lower than the indoor temperature. During a temperature transition from the initial thermostat setpoint to the new thermostat setpoint, conditions are appropriate to estimate the time constant of the building or home.

Figure 3:
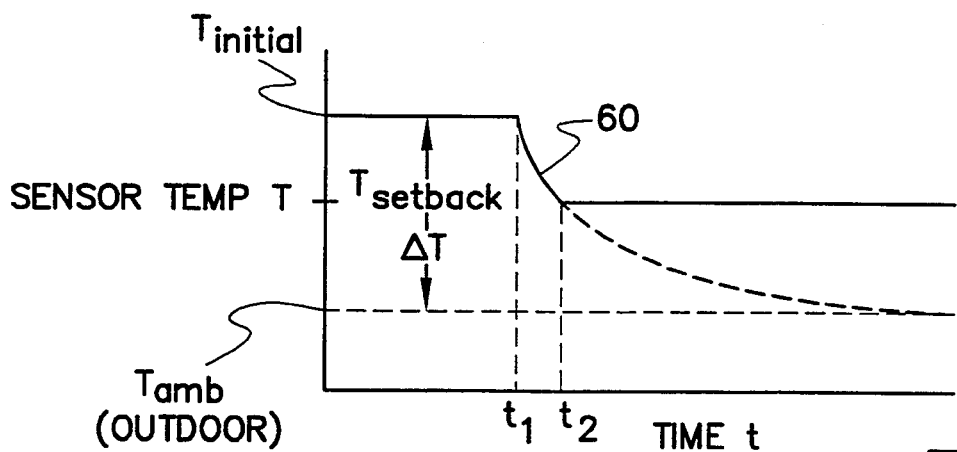
FIG. 3 shows a graph of the theoretical temperature decay of a building, assuming that the heating plant was turned off indefinitely.

The temperature decay during a set-back of the heating system can be more clearly seen from FIG. 3. Upon initiation of a set-back (time $t_1$), furnace 22 is turned off and remains off until the temperature drops to the set-back temperature (at time $t_2$). Theoretically, if furnace 22 was to remain off indefinitely, the temperature within the house would continue to drop until it was equal to the outdoor air temperature, as graphically illustrated by curve 60. This drop in temperature can be characterized by the exponential equation shown below.

$$T(\tau) = T_{amb} + (T_{initial} - T_{amb})e^{-t/\tau} \qquad (1)$$

Where T is space temperature, $T_{initial}$ is the temperature at the initiation of the set-back, $T_{amb}$ is the ambient or outdoor temperature, t is the time after set-back begins, and $\tau$ is the time constant of the temperature decay. In actual operation, once the space temperature reaches $T_{set-back}$ thermostat 10 and furnace 22 operate to maintain $T_{set-back}$ at time $t_2$. Equation 1 contains two unknowns: $T_{amb}$ and $\tau$. If two samples are taken during the set-back, the unknowns can be calculated by solving simultaneous equations. Since the equations are nonlinear, an iterative solution will be required. (Referring back to FIG. 2, see 230).

Upon calculating an estimate for the ambient temperature ($T_{amb}$), delta T ($\Delta T$) can be calculated, using the equation below.

$$\Delta T = T_{initial} - T_{amb} \qquad (2)$$

In equation 2, $T_{amb}$ is the ambient temperature which was estimated from equation 1, and $T_{initial}$ is the thermostat setpoint at the time immediately prior to the thermostat set-back. The value of $\Delta T$ is an estimated difference between the temperature setpoint and the outdoor temperature.

Figure 4:
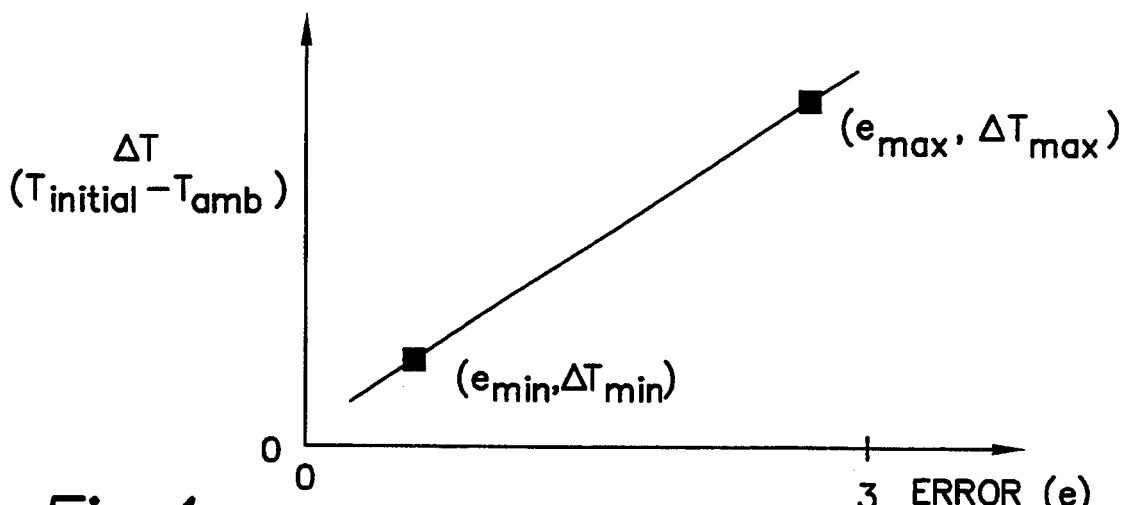
FIG. 4 shows a typical relationship between the thermostat error signal, and the variable $\Delta T$.

Referring now to FIG. 4, the heating load of the home or building is proportional to the error signal(e). The relationship between error signal(e) and the variable $\Delta T$ is linear. $\Delta T$ can be estimated if the nature of the linear relationship and the error signal(e) is known. Therefore, it is necessary to establish the nature of the linear relationship between the error signal (e) and $\Delta T$.

This linear relationship can be determined by monitoring the values of $\Delta T$ and e during a plurality of set-back periods. By determining at least two of (e, $\Delta T$) pairs, the basic nature of the linear relationship can be calculated using conventional means.

For subsequent set-back periods, once a value of $\Delta T$ is calculated, a test can be made to determine if the (e, $\Delta T$) pair are the smallest values or the largest values ever seen by humidistat reset control 14. If it is found that the (e, $\Delta T$) pair is a maximum or a minimum, their values are stored in memory. By storing the maximum and minimum (e, $\Delta T$) pair, the best-fit of the linear relationship between these two variables is established for a particular home or building. (See FIG. 2, 240).

This relationship can be used when thermostat 10 is running at a constant setpoint to estimate outdoor temperature and make adjustments to humidistat 12 as described further below.

Referring again to FIG. 2 if the set-back signal 29 indicates that the thermostat is not operating in a set-back condition then a recovery status signal 33 is checked. The recovery status signal will indicate if thermostat 10 is causing the temperature to increase to a new setpoint which is higher than the previous setpoint. The value of the recovery status signal 33 will determine how humidistat reset control 14 operates. If the recovery status signal indicates that thermostat 10 is recovering from a lower temperature, then perceived changes in the heating load will not necessarily be caused by changes in the outdoor temperature. Therefore, humidistat reset control 14 will output a signal to humidistat setpoint control 34 which will cause the humidistat setpoint to remain unchanged. Humidistat reset control 14 will then simply wait until the recovery status signal indicates that the thermostat is operating at a constant setpoint. (See 250).

If the recovery status signal 33 indicates that thermostat 10 is not recovering from a lower thermostat setpoint, and the set-back status signal 32 indicates that thermostat 10 is not causing a temperature set-back, it can be inferred that thermostat 10 is running at a constant temperature setpoint. Once it is determined that thermostat 10 is operating at a constant temperature setpoint, changes in heating system load will indicate changes in outdoor temperature. Therefore, humidistat 12 can be adjusted accordingly as described below.

The first step in determining an appropriate humidistat 12 setting is to read the error signal 28 presently being output from thermostat 10 (See 260). The error signal, along with the data stored from the set-back operation concerning e, $\Delta T$ is used to estimate the present outdoor air temperature. As previously mentioned, maximum and minimum values of the error signal 28 ($e_{min}$ & $e_{max}$) and their related $\Delta T$ value have been stored in memory. The nature of the linear relationship between the error signal 28 and the value of $\Delta T$ can be calculated using conventional methods and stored in memory. This relationship is shown graphically in FIG. 4. Therefore, for a given error signal 28, a value for $\Delta T$ can be obtained by using the linear relationships stored in memory, and the estimated $T_{amb}$ can be calculated. The calculation is:

$$T_{amb} = T_{set} - \Delta T \qquad (3)$$

where $T_{set}$ is the constant temperature setpoint (See 270).

There has been much experimentation to determine what the relative humidity levels within a building should be in order to avoid condensation on the windows, when given the outdoor temperature. The value of relative humidity desired to avoid condensation depends upon the outdoor temperature and the type of window. Based upon experimental data, the relationships between the ambient temperature outdoors and the desired relative humidity can be approximated by equations 4 and 5.

$$RH_{limit} = 30.33 + 0.5512 T_{amb} + 0.003929 T_{amb}^2 \qquad (4)$$

$$RH_{limit} = 10.09 + 0.4280 T_{amb} + 0.007083 T_{amb}^2 \qquad (5)$$

Ref. ASHRAE Equipment Handbook, 1988 (Chap. 5)

Figure 5:
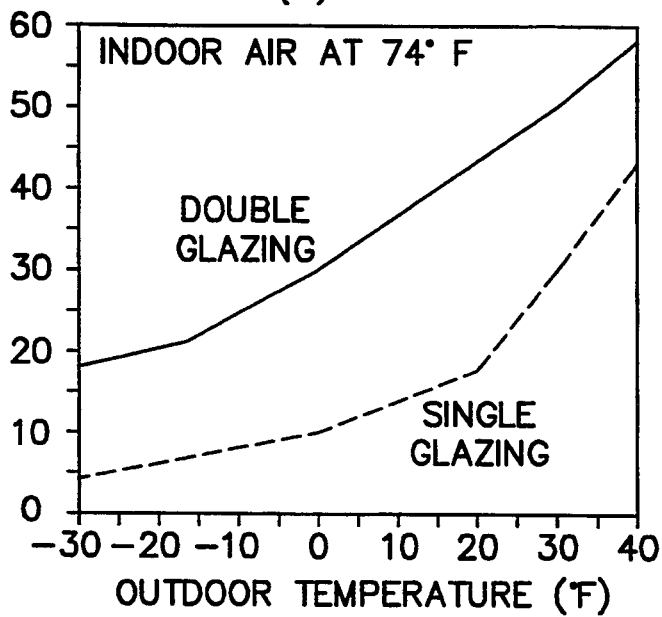
FIG. 5 shows the accepted levels of relative humidity to avoid condensation on the windows at different temperatures.

This relationship is dependent upon the type of windows in the building. Equation 4 shows the relationship for single pane windows and equation 5 shows the relationship for double paned windows. A diagram of these equations is shown in FIG. 5.

Therefore, once the ambient temperature is estimated, a value for the relative humidity necessary to avoid condensation on the windows can be calculated (See 280). This calculated relative humidity is then the calculated humidistat setpoint, to be communicated to humidistat setpoint control 34.

Other building related factors could also potentially be used as a basis for adjusting humidistat reset control 34 so long as the relationship which is the basis for control can be calculated, or stored in look-up tables in memory, or otherwise made available for use as described below.

A calculated humidistat setpoint signal corresponding to the calculated humidistat setpoint is then transmitted to the humidistat setpoint control 34. The humidistat setpoint control 34 compares the calculated humidistat setpoint with the manual humidistat setpoint. If the calculated humidistat setpoint is lower than the manual humidistat setpoint, a humidifier control signal 41 corresponding to the calculated humidistat setpoint is output to humidifier control 41. However, if the calculated humidistat setpoint is greater that the manual humidistat setpoint, a humidifier control signal 41 equal to the manual humidistat setpoint is transmitted to humidifier control 41. Humidifier control 41 then controls the humidity within a space based upon the signal received from humidistat setpoint control 34 (See 290).

Humidistat setpoint control 34 also has the capability to manually control humidistat 12. When the homeowner has humidistat 12 in a manual override mode, humidistat 12 will control the humidity at the manual setpoint regardless of the outdoor temperature.

The humidistat reset control 14 utilizes a microprocessor having a plurality of inputs and outputs. This microprocessor also must be capable of conducting the required calculations and executing the necessary logic to control the humidistat. A microprocessor capable of these tasks is the NEC 7503.

Having described the principles of the invention in a preferred and a second embodiment, it should be apparent to those skilled in the art that the invention can be modified in arrangement and detail without departing from such principles. We claim all modifications coming within the spirit and scope of the following claims.

What is claimed is:

1. An environmental control system for controlling the temperature and humidity of a space, comprising:

temperature control means having a temperature setpoint, a heating system output and an operation output, said temperature control means for controlling a means for heating;

humidity control means having an adjustable setpoint and an output for controlling a humidifier, said humidity control means connected to said temperature control means operation output, wherein said humidity control means further comprises:

means for monitoring the setback status of said temperature control means, the sensed temperature of said temperature control means, the temperature setpoint of said temperature control means, and the error signal of said temperature control means, means to calculate an estimated outdoor temperature, based upon said sensed temperature, said temperature setpoint, and said error signal, and;

means to calculate a calculated humidistat setpoint based upon said estimated outdoor temperature; and means for adjusting said humidity control means setpoint based on said calculated humidity setpoint.

2. The environmental control system of claim 1, wherein said humidity control means further comprises means to output a signal that is indicative of said calculated humidity setpoint.

3. The environmental control system of claim 2, wherein said humidity control means is adapted to connect to a humidity sensor.

4. The environmental control system of claim 3, wherein said humidity control means further comprises:

means to compare said calculated humidity setpoint with said adjustable setpoint of said humidity control and set an effective humidity setpoint equal to the lower of these two values; and means to control the humidifier based upon the difference between sensed humidity by said humidity sensor and said effective humidity setpoint of said humidistat.

5. The environmental control system of claim 4 wherein said adjustable setpoint is a manually adjustable setpoint.

6. The environmental control system of claim 2 wherein said humidity control means comprises means to determine the setback status of said thermostat, and;

if said setback status indicates that said thermostat is currently causing a temperature set-back or a temperature set-up, said calculated humidity setpoint will remain unchanged, and;

if said setback status indicates that said thermostat is not currently causing a temperature setback or a temperature set-up, said humidity control means calculates a new calculated humidity setpoint and outputs a signal indicative of said new calculated humidity setpoint to said humidistat.

7. The humidity control system of claim 1 wherein all of the parts are embodied in one package.

8. The humidity control system of claim 1 wherein the humidity control means has an output for controlling a dehumidifier.

9. The humidity control system of claim 1 wherein the humidity control means has an output for controlling an outdoor air ventilation cycle.

10. A humidity control means adapted for use along with a humidistat having an alterable setpoint and a thermostat, comprising:

a plurality of input means adapted to receive signals from the thermostat and the humidistat;

output means adapted to communicate a signal to the humidistat that is indicative of the effective humidity setpoint to be used by the humidistat;

computing means adapted to calculate the appropriate effective humidity setpoint based upon signals received at said plurality of input means;

memory means adapted to connect to said computing means wherein said memory means contains information that causes said computing means to calculate an estimated outdoor temperature and a humidity setpoint limit, compare said humidity setpoint limit with said current humidistat setpoint whereby if said humidity setpoint limit is less than said current humidistat setpoint, set said effective humidistat setpoint equal to said humidity setpoint limit, and;

if said humidity setpoint limit is greater than said current humidistat setpoint, set said effective humidistat setpoint equal to said current humidistat setpoint.

11. A method for controlling the humidity level of a space so as to avoid condensation, based on estimating the outdoor temperature and setting effective humidistat setpoint in relation to the estimated outdoor temperature which comprises:

Determining the thermostat setpoint and error signal;
Calculating an estimated outdoor temperature;
Calculating a humidity setpoint limit;
Determining the current humidistat setpoint;
Comparing the current humidistat setpoint with the calculated humidity setpoint limit;
Setting the effective humidistat setpoint equal to the calculated humidity setpoint limit if the calculated humidity setpoint is less than the current humidistat setpoint, and;
Setting the effective humidistat setpoint equal to the current humidistat setpoint if the calculated humidity setpoint limit is greater than the current humidistat setpoint.

12. An environmental control system for controlling the temperature and humidity of a space, comprising:

humidity control means having an adjustable setpoint and an output for controlling a humidifier;

temperature control means having a temperature setpoint, a heating system output and an operation output, said operation output connected to said humidity control means, said temperature control means for controlling a means for heating;

means for calculating an estimated outdoor temperature based upon said operation output and subsequently calculating a calculated humidity setpoint based upon estimated outdoor temperature; and means for adjusting said humidity control means setpoint based on said calculated humidity setpoint.

13. The environmental control system of claim 12, wherein said humidity control means comprises:

means for monitoring the setback status of said temperature control means, the sensed temperature of said temperature control means, the temperature setpoint of said temperature control means, and the error signal of said temperature control means, means to calculate an estimated outdoor temperature, based upon said sensed temperature, said temperature setpoint, and said error signal, and;

means to calculate said calculated humidistat setpoint based upon said estimated outdoor temperature.

14. The environmental control system of claim 13, wherein said humidity control means further comprises means to output a signal that is indicative of said calculated humidity setpoint.

15. The environmental control system of claim 14, wherein said humidity control means is adapted to connect to a humidity sensor.

16. The environmental control system of claim 15, wherein said humidity control means further comprises:

means to compare said calculated humidity setpoint with said adjustable setpoint of said humidity control and set an effective humidity setpoint equal to the lower of these two values; and means to control the humidifier based upon the difference between sensed humidity by said humidity sensor and said effective humidity setpoint of said humidistat.

17. The environmental control system of claim 16 wherein said adjustable setpoint is a manually adjustable setpoint.

18. The environmental control system of claim 14 wherein said humidity control means comprises means to determine the setback status of said thermostat, and;

if said setback status indicates that said thermostat is currently causing a temperature set-back or a temperature set-up, said calculated humidity setpoint will remain unchanged, and;

if said setback status indicates that said thermostat is not currently causing a temperature set-back or a temperature set-up, said humidity control means calculates a new calculated humidity setpoint and outputs a signal indicative of said new calculated humidity setpoint to said humidistat.

* * * * *